(12) United States Patent
Chavez et al.

(10) Patent No.: US 9,740,966 B1
(45) Date of Patent: Aug. 22, 2017

(54) TAGGING SIMILAR IMAGES USING NEURAL NETWORK

(71) Applicant: International Business Machines Corporation, Armonk, NY (US)

(72) Inventors: Aaron J. Chavez, Denver, CO (US); Devin R. Harper, Denver, CO (US); Nicholas A. Lineback, Alameda, CA (US); Elliot B. Turner, Denver, CO (US)

(73) Assignee: Internation Business Machines Corporation, Armonk, NY (US)

( * ) Notice: Subject to any disclaimer, the term of this patent is extended or adjusted under 35 U.S.C. 154(b) by 39 days.

(21) Appl. No.: 15/016,607

(22) Filed: Feb. 5, 2016

(51) Int. Cl.
*G06K 9/66* (2006.01)
*G06K 9/62* (2006.01)

(52) U.S. Cl.
CPC .............. *G06K 9/66* (2013.01); *G06K 9/6221* (2013.01); *G06K 9/6276* (2013.01)

(58) Field of Classification Search
CPC ....... G06K 9/66; G06K 9/6221; G06K 9/6276
USPC ........................................................ 382/158
See application file for complete search history.

(56) References Cited

U.S. PATENT DOCUMENTS

| | | | |
|---|---|---|---|
| 6,038,337 A | 3/2000 | Lawrence et al. | |
| 2005/0018904 A1* | 1/2005 | Davis ................... | G06T 7/0079 382/181 |
| 2008/0159622 A1 | 7/2008 | Agnihotri et al. | |
| 2010/0026842 A1* | 2/2010 | Ishizaka ............ | G06F 17/30781 348/231.2 |
| 2011/0078584 A1 | 3/2011 | Winterstein et al. | |
| 2013/0262505 A1* | 10/2013 | Buckley ............ | G06F 17/30247 707/769 |
| 2014/0365949 A1* | 12/2014 | Xia .................... | G06K 9/00436 715/780 |

OTHER PUBLICATIONS

Ren et al, "Learning Convolutional NonLinear Features for K Nearest Neighbor Image Classification," 2014 22nd International Conference on Pattern Recognition, Aug. 2014, Stockholm, Sweden, pp. 4358-4363.

Seetha et al, "Performance Assessment of Neural Network and K-Nearest Neighbour Classification with Random Subwindows," International Journal of Machine Learning and Computing, vol. 2, No. 6, Dec. 2012, pp. 844-847.

* cited by examiner

*Primary Examiner* — Amandeep Saini
(74) *Attorney, Agent, or Firm* — VanLeeuwen & VanLeeuwen; William J. Stack (57) ABSTRACT

An approach is provided in which a knowledge manager selects an extraction layer from a convolutional neural network that was trained on an initial set of images. The knowledge manager processes subsequent images obtained from crawling a computer network that includes extracting image feature sets of the subsequent images from the selected extraction layer and generating tags from metadata associated with the subsequent images. In turn, the knowledge manager receives a new image, extracts a new image feature set from the selected extraction layer, and assigns one or more of the tags to the new image based upon evaluating the new image feature set to the image features sets of the subsequent images.

14 Claims, 7 Drawing Sheets

TAGGING SIMILAR IMAGES USING NEURAL NETWORK

BACKGROUND

The present disclosure relates to tagging similar images using a convolutional neural network.

Deep learning is a branch of machine learning based on a set of algorithms that model high-level abstractions in data by using multiple processing layers with complex structures. Various deep learning architectures are used in technological systems such as computer vision systems, automatic speech recognition systems, natural language processing systems, audio recognition systems, question answer systems, etc.

The technological systems, such as question answer systems, may employ classifiers utilizing the deep learning architectures to generate decisions for a set of input criteria. The classifiers may include algorithms structured in the form of a deep learning architecture such as a convolutional neural network that includes various combinations of convolutional layers and fully connected layers.

Prior to using classifiers in a question answer system, the classifiers are specifically trained using a substantial set of training samples such that the classifiers are able to classify new information received by the question answer system.

BRIEF SUMMARY

According to one embodiment of the present disclosure, an approach is provided in which a knowledge manager selects an extraction layer from a convolutional neural network that was trained on an initial set of images. The knowledge manager processes subsequent images obtained from crawling a computer network that includes extracting image feature sets of the subsequent images from the selected extraction layer and generating tags from metadata associated with the subsequent images. In turn, the knowledge manager receives a new image, extracts a new image feature set from the selected extraction layer, and assigns one or more of the tags to the new image based upon evaluating the new image feature set to the image features sets of the subsequent images.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
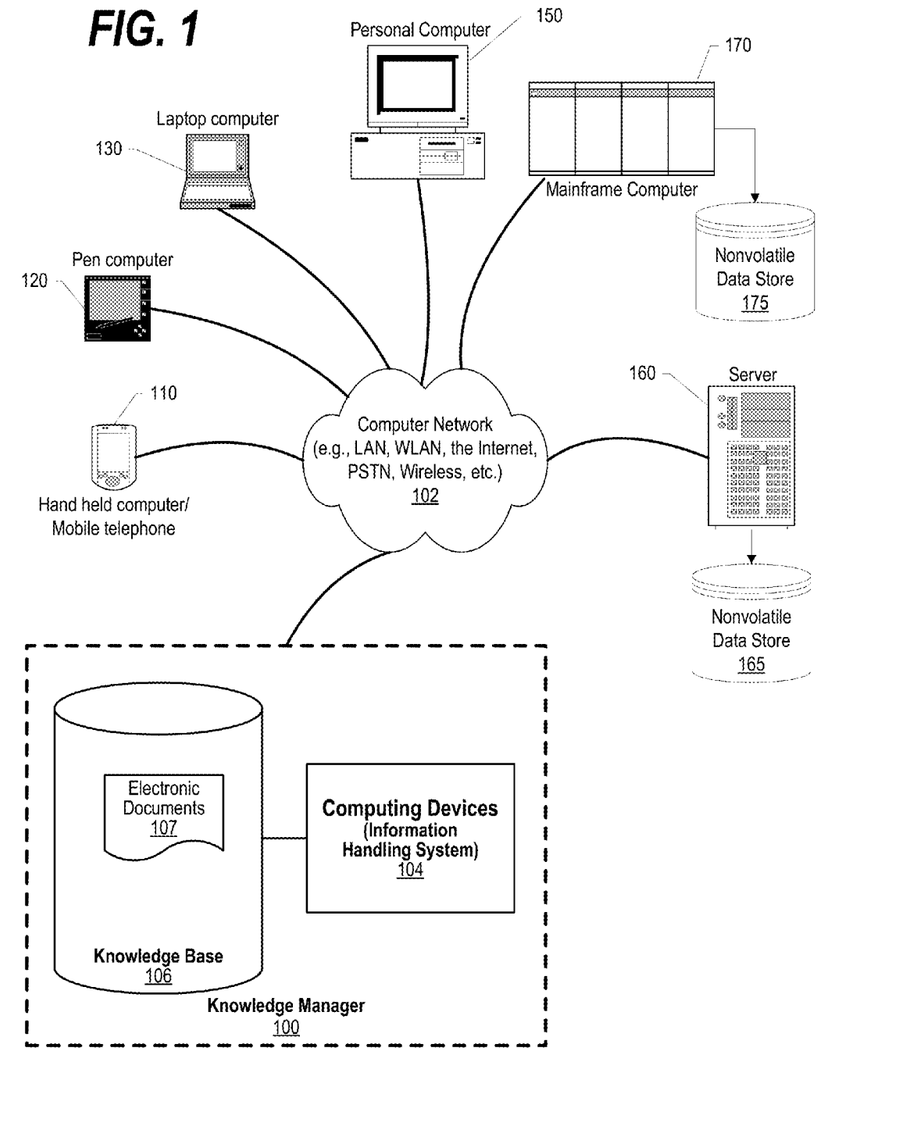
FIG. 1 is a block diagram of a data processing system in which the methods described herein can be implemented.

FIG. 1 depicts a schematic diagram of one illustrative embodiment of a question/answer (QA) system knowledge manager 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 107 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured resource sources. In this manner, some processes populate the knowledge manager with the knowledge manager also including input interfaces to receive knowledge requests and respond accordingly.

In one embodiment, the content creator creates content in a document 107 for use as part of a corpus of data with knowledge manager 100. The document 107 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
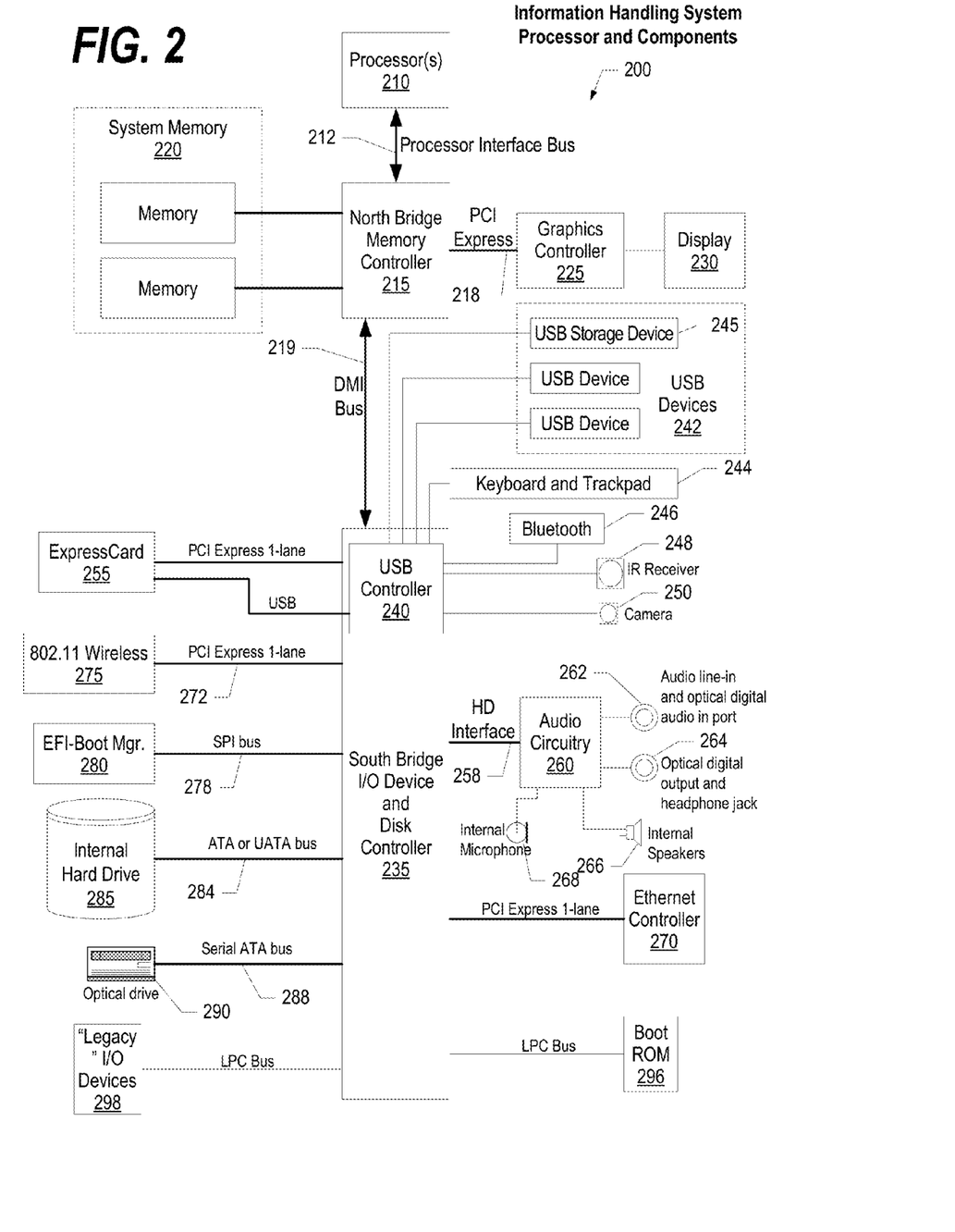
FIG. 2 provides an extension of the information handling system environment shown in FIG. 1 to illustrate that the methods described herein can be performed on a wide variety of information handling systems which operate in a networked environment.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3 through 6 depict an approach directed towards open domain tagging of images, which can be executed on an information handling system such as a knowledge manager. The knowledge manager selects an extraction layer from a classifier's convolutional neural network trained to classify images using an initial training set. The knowledge manager then "crawls" a computer network, such as the Internet, and locates images with associated metadata. Using the located images and metadata, the knowledge manager extracts feature sets from the selected extraction layer, generates tags based on the image metadata, and stores the extracted feature sets with tags in a domain space, which may or may not be the same as the initial training set. In turn, the classifier evaluates new images and assigns tags based upon the domain space.

Figure 3:
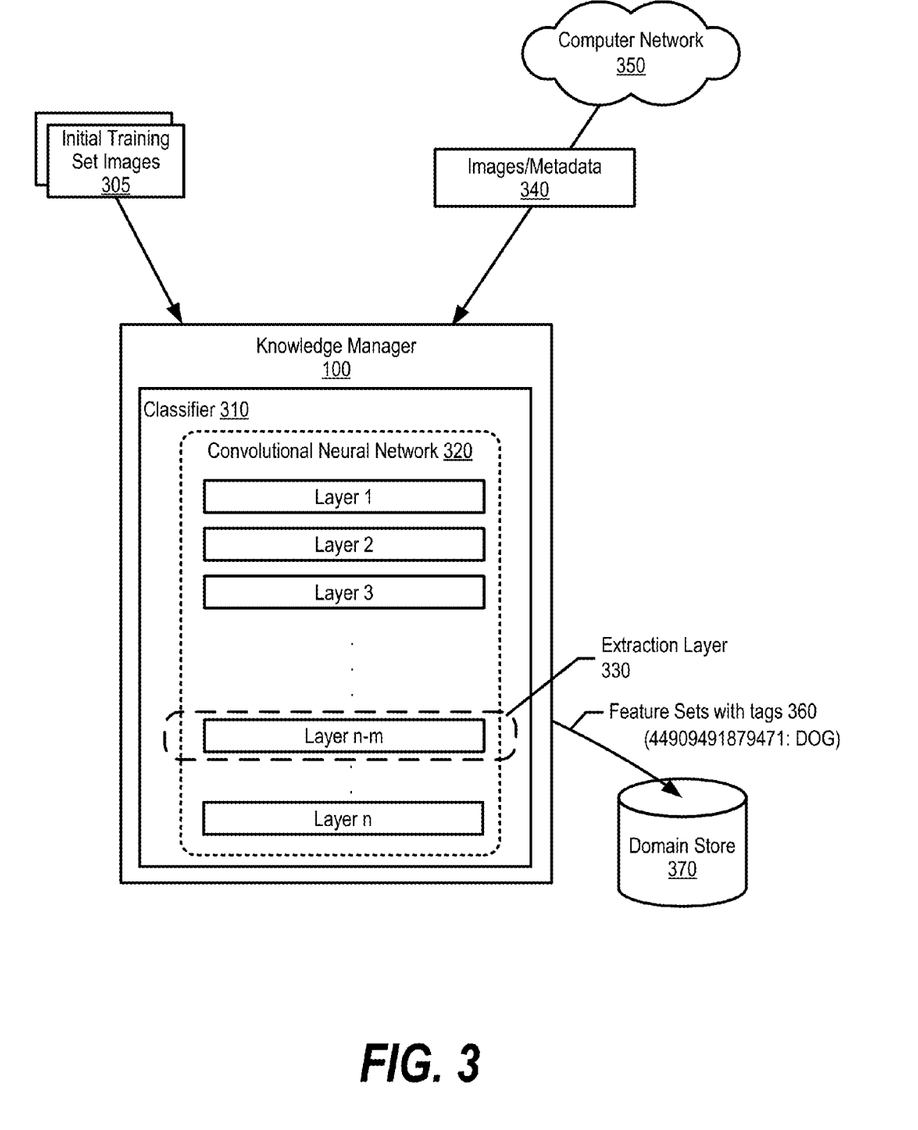
FIG. 3 is a diagram depicting a knowledge manager that enhances classification ability of a classifier based upon extracting feature sets from images obtained from a computer network and using the extracted feature sets for subsequent image classification.

FIG. 3 is a diagram depicting a knowledge manager that enhances classification abilities of a classifier based upon extracting feature sets from images obtained from a computer network and using the extracted feature sets for subsequent image classification.

Knowledge manager 100 trains classifier 310 using initial training set images 305 that includes, for example, 1,000 images of birds. The training process includes training the various layers in convolutional neural network 320. After the training process, convolutional neural network 320 is specifically trained for image classification.

Next, knowledge manager 100 selects extraction layer 330 to extract feature sets. In one embodiment, convolutional neural network 320 includes several layers of successive convolutions followed by a few fully-connected non-convolutional layers. In this embodiment, knowledge manager 100 may select the first fully connected layer after the convolutional layers as the feature extraction layer.

Knowledge manager 100 then crawls computer network 350, such as the Internet, and obtains a multitude of images with metadata 340. For example, knowledge manager 100 may obtain a million images relating to various subjects, which may or may not be related to initial training set images 305. Knowledge manager 100 processes each image using classifier 310 and extracts feature sets from extraction layer 330. Knowledge manager also generates tag(s) based on the images' metadata and stores the extracted feature sets with tags 360 into domain store 370. For example, an image of a Golden Retriever may have metadata such as "dog" and the process stores an extracted feature set (e.g., 5800388549837854) and "dog" in domain store 370.

At this point, domain store 370 may include millions of feature set/tag entries based upon the amount of images processed while crawling computer network 350. As such, knowledge manager 100 may use domain store 370 to analyze and tag new images that include objects that were not included in initial training set images 305 (see FIG. 4 and corresponding text for further details).

Figure 4:
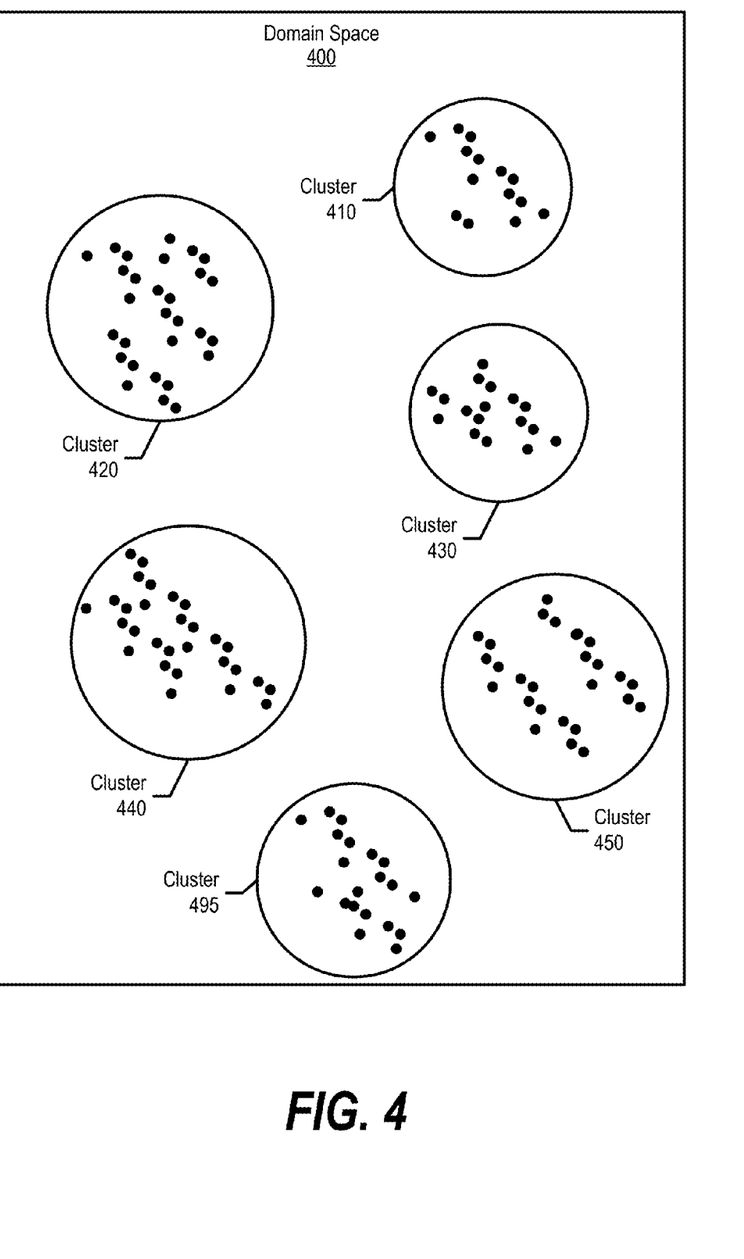
FIG. 4 is a diagram depicting a domain space that includes feature sets extracted from a convolutional neural network's extraction layer.

FIG. 4 is a diagram depicting a domain space that includes feature sets extracted from a convolutional neural network's extraction layer discussed in FIG. 3. Domain space 400 resides in domain store 370 and includes multiple feature sets represented by black dots that correspond to images obtained by crawling the Internet. As those skilled in the art can appreciate, many more feature sets may exist in domain space 400, such as one million feature sets.

Figure 6:
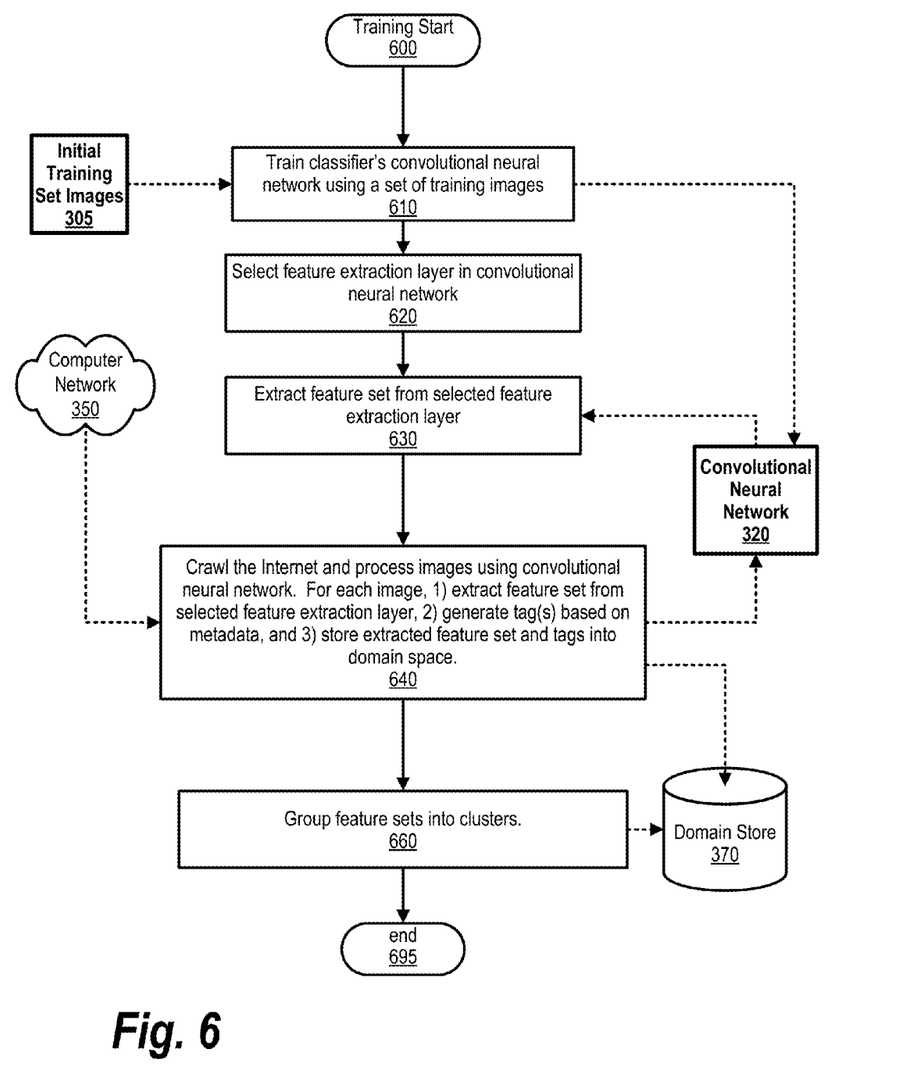
FIG. 6 is a flowchart showing steps taken to train a classifier for image classification and then use extracted features from the trained classifier to classify images with tags obtained from crawling a computer network.

Domain space 400 shows that the feature sets are grouped into clusters 410-495 based upon performing a nearest neighbors search or based on similar tags discussed in FIG. 6. The clusters may not be based on the initial training set images, but rather the images obtained from crawling computer network 350.

Figure 5:
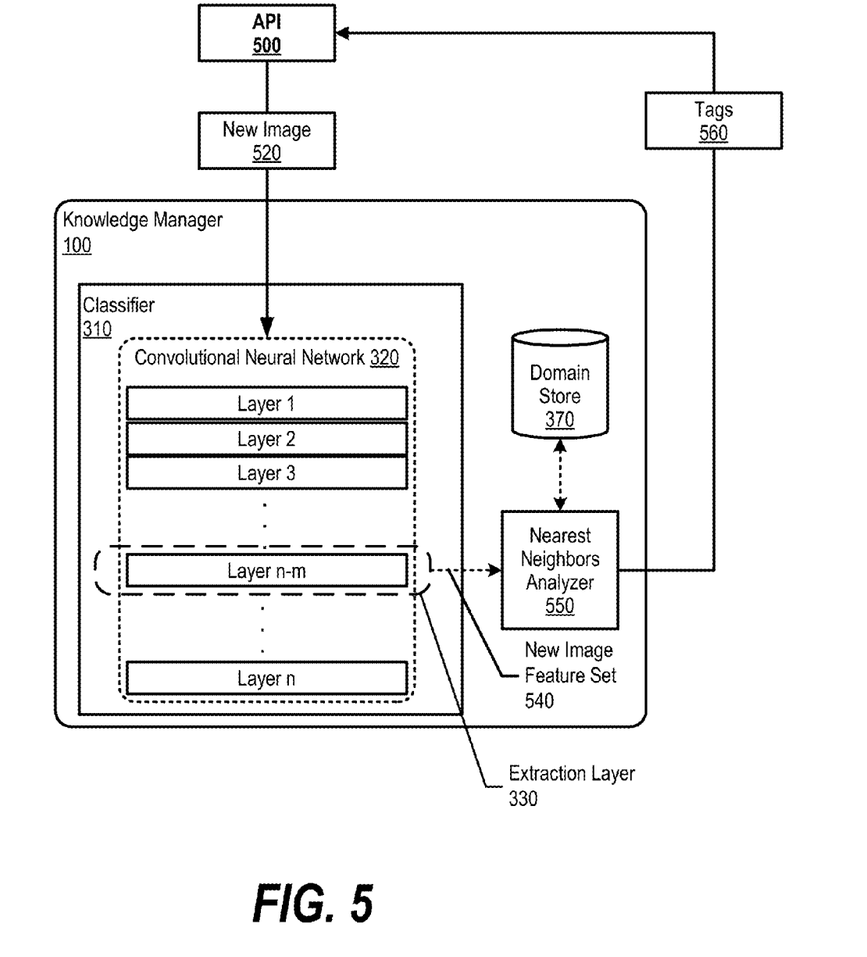
FIG. 5 is a diagram depicting a knowledge manager assigning tags to a new image based on performing a nearest neighbors search on feature sets extracted from the new image.
Figure 7:
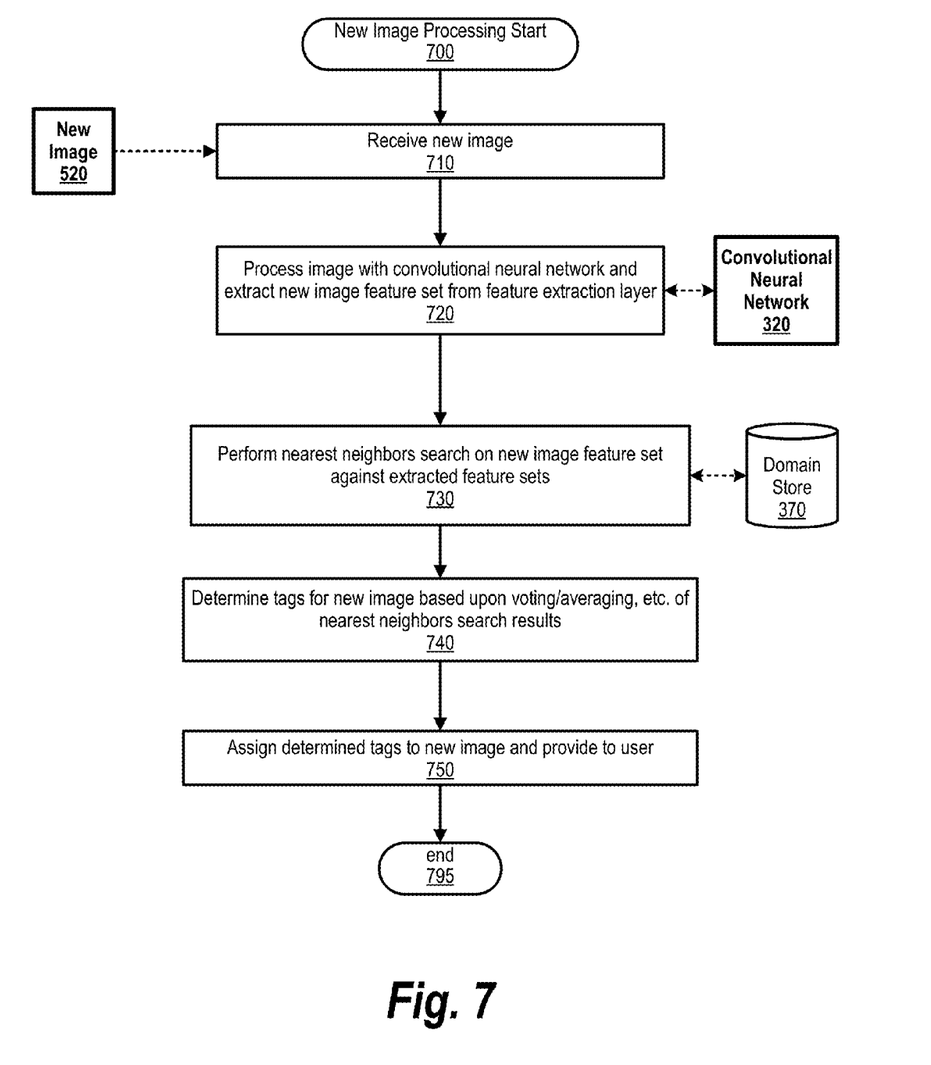
FIG. 7 is a flowchart showing steps taken to assign a classification to a new image based upon classifications determined in FIG. 6.

As such, when a new image is received, knowledge manager 100 processes the images using domain space 400 and provides tags to the new image accordingly (see FIGS. 5, 7, and corresponding text for further details).

FIG. 5 is a diagram depicting a knowledge manager assigning tags to a new image based on performing a nearest neighbors search on feature sets extracted from the new image. Knowledge manager 100 receives new image 520 via API 500 and feeds new image 520 into classifier 310 that uses convolutional neural network 320 to process the image. Knowledge manager 100 extracts new image feature set 540 from extraction layer 330 and uses nearest neighbors analyzer 550 to perform a nearest neighbors search on domain space 400 included in domain store 370.

Nearest neighbors analyzer 550 determines tags 560 based on the nearest neighbors search. In one embodiment, nearest neighbors analyzer 550 performs a voting/averaging step of classes identified in the nearest neighbors search (see FIG. 7 and corresponding text for further details).

FIG. 6 is a flowchart showing steps taken by a process to train a classifier for image classification and then use extracted features from the trained classifier to classify images with tags obtained from crawling the Internet. FIG. 6 processing commences at 600 whereupon, at step 610, the process trains the classifier's convolutional neural network 320 using a set of initial training images 305. For example, initial training set images 305 may include 1,000 images of different animals.

At step 620, the process selects a specific feature extraction layer in convolutional neural network 320 from which to extract feature set information. In one embodiment, convolutional neural network 320 includes several layers of successive convolutions followed by a few fully-connected non-convolutional layers. In this embodiment, the process may select the first fully connected layer after the convolutional layers as the feature extraction layer. At step 630, the process extracts a feature set from the selected feature extraction layer. Continuing with the embodiment above, the process extracts the feature set from the output of the first fully connected layer.

At step 640, the process crawls the Internet via computer network 350 and processes multiple images that include corresponding metadata. For example, the process may process a million images found on the Internet. For each image, the process 1) extracts a feature set from the selected feature extraction layer, 2) generates tag(s) based on the metadata associated with the image, and 3) stores the extracted feature set and tags into a domain space that is stored in domain store 370. For example, an image of a Golden Retriever may have metadata such as "dog" and the process stores an extracted feature set (e.g., 5800388549837854) and "dog" in domain store 370. At this point, domain store 370 may include millions of feature set/tag entries based upon the amount of images processed while crawling the Internet.

At step 660, the process groups the feature sets into clusters based upon, for example, matching tag information or nearest neighbors search results (see FIG. 4 and corresponding text for further details). FIG. 6 processing thereafter ends at 695.

FIG. 7 is a flowchart showing steps taken to assign a classification to a new image based upon classifications determined in FIG. 6. Processing commences at 700 whereupon, at step 710, the process receives new image 520. At step 720, the process processes the image with convolutional neural network 320 and extracts a new image feature set from the feature extraction layer, which is the same feature set extraction layer selected at step 620 in FIG. 6.

At step 730, the process performs a nearest neighbors search on the new image feature set against the extracted feature sets that were classified in domain store 370 at step 660 in FIG. 6. In one embodiment, the process identifies the nearest clusters and then finds the nearest images (feature sets) within the nearest clusters.

At step 740, the process determines tags for the new image based upon the nearest neighbors search. In one embodiment, the process performs a voting/averaging of the nearest neighbors search results and determines tags accordingly. For example, the nearest neighbors search may result in a probability of 70% that the image includes a dog and, in turn, the process assigns a "dog" tag to the image.

At step 750, the process assigns the determined tags to the image and provides the tags to a user. FIG. 7 processing thereafter ends at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

training a classifier on a first set of images, wherein the classifier comprises a convolutional neural network that includes a plurality of layers;

processing a second set of images using the trained classifier, wherein the processing comprises:
   extracting a plurality of feature sets from a selected layer included in the plurality of layers; and
   generating a plurality of tags based upon metadata corresponding to the second set of images;

selecting a subset of the plurality of tags based on performing a nearest neighbors search on a new image feature set corresponding to a new image, wherein the new image feature set is extracted from the selected layer during processing of the new image; and assigning at least one of the subset of the plurality of tags to the new image based upon voting on the subset of the plurality of tags.

2. The method of claim 1 wherein the selected layer is not a last layer in the plurality of layers.

3. The method of claim 2 wherein the plurality of layers includes a set of convolutional layers and a subsequent set of fully connected non-convolutional layers, and wherein the selected layer is a first layer in the subsequent set of fully-connected non-convolutional layers.

4. The method of claim 1 wherein the first set of images includes a first set of object types that are different from a second set of object types included in the second set of images.

5. The method of claim 1 further comprising searching the Internet to obtain the second set of images.

6. An information handling system comprising:
   one or more processors;
   a memory coupled to at least one of the processors; and
   a set of computer program instructions stored in the memory and executed by at least one of the processors in order to perform actions of:
      training a classifier on a first set of images, wherein the classifier comprises a convolutional neural network that includes a plurality of layers;
      processing a second set of images using the trained classifier, wherein the processing comprises:
         extracting a plurality of feature sets from a selected layer included in the plurality of layers; and
         generating a plurality of tags based upon metadata corresponding to the second set of images;
      selecting a subset of the plurality of tags based on performing a nearest neighbors search on a new image feature set corresponding to a new image, wherein the new image feature set is extracted from the selected layer during processing of the new image; and
      assigning at least one of the subset of the plurality of tags to the new image based upon voting on the subset of the plurality of tags.

7. The information handling system of claim 6 wherein the selected layer is not a last layer in the plurality of layers.

8. The information handling system of claim 7 wherein the plurality of layers includes a set of convolutional layers and a subsequent set of fully connected non-convolutional layers, and wherein the selected layer is a first layer in the subsequent set of fully-connected non-convolutional layers.

9. The information handling system of claim 6 wherein the first set of images includes a first set of object types that are different from a second set of object types included in the second set of images.

10. The information handling system of claim 6 wherein at least one of the one or more processors perform additional actions comprising:
   searching the Internet to obtain the second set of images.

11. A computer program product stored in a computer readable storage medium, comprising computer program code that, when executed by an information handling system, causes the information handling system to perform actions comprising:
   training a classifier on a first set of images, wherein the classifier comprises a convolutional neural network that includes a plurality of layers;
   processing a second set of images using the trained classifier, wherein the processing comprises:
      extracting a plurality of feature sets from a selected layer included in the plurality of layers; and
      generating a plurality of tags based upon metadata corresponding to the second set of images;
   selecting a subset of the plurality of tags based on performing a nearest neighbors search on a new image feature set corresponding to a new image, wherein the new image feature set is extracted from the selected layer during processing of the new image; and
   assigning at least one of the subset of the plurality of tags to the new image based upon voting on the subset of the plurality of tags.

12. The computer program product of claim 11 wherein the selected layer is not a last layer in the plurality of layers.

13. The computer program product of claim 12 wherein the plurality of layers includes a set of convolutional layers and a subsequent set of fully connected non-convolutional layers, and wherein the selected layer is a first layer in the subsequent set of fully-connected non-convolutional layers.

14. The computer program product of claim 11 wherein the first set of images includes a first set of object types that are different from a second set of object types included in the second set of images.

* * * * *